United States Patent
Montgomery

[11] 3,730,507
[45] May 1, 1973

[54] BORON NITRIDE BASE EVAPORATION VESSEL HAVING A SURFACE COATING OF TITANIUM-SILICON THEREON

[75] Inventor: Lionel C. Montgomery, North Olmsted, Ohio

[73] Assignee: Union Carbide Corporation, New York, N.Y.

[22] Filed: Jan. 18, 1971

[21] Appl. No.: 107,542

Related U.S. Application Data

[63] Continuation of Ser. No. 742,446, July 3, 1968, abandoned.

[52] U.S. Cl. ............... 266/39, 117/123 B, 263/48
[51] Int. Cl. ............................................. C23c 13/12
[58] Field of Search ............... 266/39, 43; 263/47, 263/48; 117/123 A, 123 B

[56] References Cited

UNITED STATES PATENTS

| | | | |
|---|---|---|---|
| 3,031,340 | 4/1962 | Girardot | 117/123 B X |
| 3,063,865 | 11/1962 | Baer et al. | 266/39 X |
| 3,084,060 | 4/1963 | Baer et al. | 266/43 X |
| 3,181,968 | 5/1965 | Mandorf, Jr. | 266/39 X |
| 3,216,710 | 11/1965 | Lenihan, Jr. et al. | 263/48 |
| 3,227,431 | 1/1966 | Steeves | 263/48 |
| 3,245,674 | 4/1966 | Baer et al. | 266/39 |

OTHER PUBLICATIONS

Boron Nitride Technical Data, Carborundum, Latrobe Plant, 4–27–66 pp. 1–5.

*Primary Examiner*—R. Spencer Annear
*Attorney*—James C. Arvantes et al.

[57] ABSTRACT

A boron nitride containing evaporation vessel which is readily wetted by molten metals and accordingly ideally suited for use in a vacuum metallizing system is provided by coating at least a portion of the evaporation surface of the vessel with a titanium-silicon base alloy.

10 Claims, 1 Drawing Figure

PATENTED MAY 1 1973　　　　　　　　　　　　3,730,507
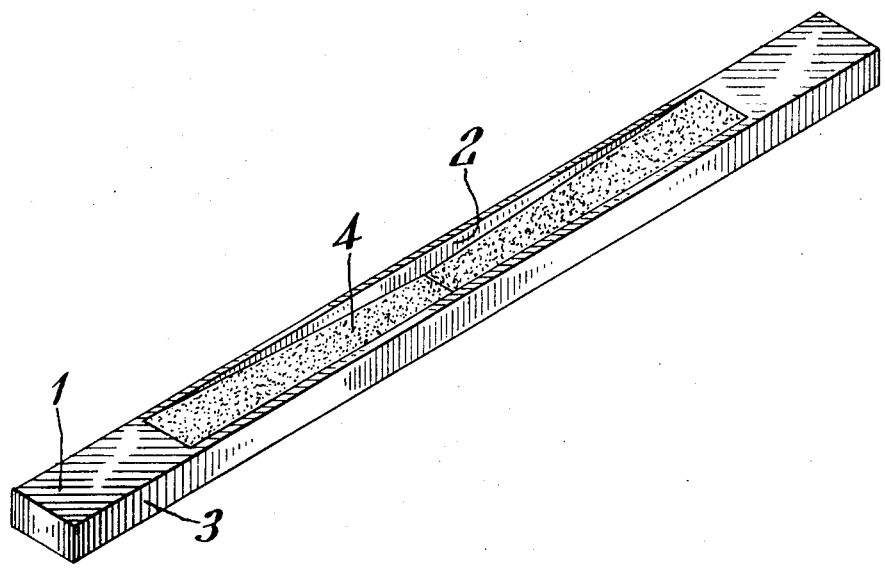
INVENTOR
LIONEL C. MONTGOMERY
BY
ATTORNEY

BORON NITRIDE BASE EVAPORATION VESSEL HAVING A SURFACE COATING OF TITANIUM-SILICON THEREON This is a continuation of application Ser. No. 742,446 filed July 3, 1968 and now abandoned.

BACKGROUND OF THE INVENTION

1. Field of the Invention

The present invention relates to a refractory boron nitride containing evaporation vessel having deposited on its evaporation surface a titanium-silicon base coating which is readily wetted by molten metals, such as molten aluminum and the like, with the coating having been formed thereon by reacting a portion of the titanium-silicon base alloy with the contacted boron nitride portion of the vessel at elevated temperatures.

2. Description of the Prior Art

It is common practice to metallize or coat various articles fashioned from such diverse materials as steel, rubber, plastic and the like by vapor depositing aluminum thereon.

In practice, the actual coating or metallizing of an article is carried out in a vacuum chamber which contains both the metal to be vaporized and, in a spaced apart relationship, the article to be coated or metallized. Generally, the metal to be vaporized is held or placed in a refractory vessel or crucible and heated therein to a temperature sufficient to cause it to become molten and commence to vaporize.

In the foregoing general process it is essential that a vessel or crucible be employed which does not react substantially with the molten aluminum. This requirement is exceptionally well satisfied by fashioning such a vessel or crucible from a refractory material such as boron nitride or a boron nitride base composite. However, one difficulty which is experienced with the use of this type of material is slow or limited wetting of the boron nitride base evaporation vessel by molten aluminum during the start up of the metallizing apparatus. This delay in wetting reduces the total efficiency of the metallizing process and is to be avoided, if possible.

The present invention overcomes the foregoing problems by providing a coating which when applied to a boron nitride base vessel renders it readily wetted by molten metals, such as molten aluminum and the like.

SUMMARY

Briefly, the instant invention is accomplished by coating at least a portion of the evaporation surface of a boron nitride base crucible or vessel which is intended for use in a vacuum metallizing system with a titanium-silicon base alloy which is both chemically and mechanically bonded thereto.

The titanium-silicon alloy is bonded to the evaporation surface of the crucible or vessel by coating that portion of the body desired to be treated with a titanium-silicon base alloy and then heating the coated body to a temperature sufficient to cause a portion of the titanium-silicon alloy to diffuse into the boron nitride base body and react with the contacted boron nitride therein while leaving at least a molecular layer of undiffused titanium-silicon alloy on the surface of the body.

The resultant titanium-silicon alloy coated boron nitride base evaporation vessel or crucible is ideally suited for use as a container for molten aluminum in a conventional vacuum metallizing system.

Accordingly, it is the principal object of the instant invention to provide a boron nitride base vessel which has on at least one of its surfaces a titanium-silicon coating which is readily wetted by molten aluminum and the like.

Another object of the invention is to provide a boron nitride base crucible or vessel which is suited for use in a conventional vacuum metallizing system.

DESCRIPTION OF THE DRAWING

The sole FIGURE shown in the drawing presented herewith is an isometric illustration of a rectangular vessel or crucible of the type commonly employed in a conventional vacuum metallizing apparatus.

Referring now to the drawing in detail, there is shown an isometric illustration of an evaporation vessel 1 having a cavity therein designated by the numeral 2. The floor of the cavity 2 constitutes the evaporation surface of the vessel 1 and is coated with a titanium-silicon base alloy 4 which is chemically and mechanically bonded thereto. The evaporation vessel 1 is formed of a boron nitride base refractory material 3.

DESCRIPTION OF THE PREFERRED EMBODIMENT OF THE INVENTION

The evaporation vessel may be fabricated either from commercially pure boron nitride or from a refractory composite material which contains a substantial amount of boron nitride. In practice, it is preferred to employ a refractory composite which contains at least 20 weight per cent boron nitride. Good results have been obtained by employing a vessel containing all boron nitride or one containing from about 20 to about 80 weight per cent boron nitride with the remainder being a compatable refractory material such as titanium diboride. The titanium diboride is added to the boron nitride base material to render the resultant article electrically conductive, if such is desired. However, it should be noted that refractory materials other than titanium diboride may be employed in the practice of the instant invention. For example, the boron nitride containing vessel may also contain one or more other refractory materials such as zirconium diboride, aluminum nitride, titanium nitride, calcium fluoride and the like. The foregoing list of materials is illustrative only and is not intended to unduly limit the scope of the instant invention.

Generally, the titanium-silicon alloy is bonded to the evaporation surface of the boron nitride containing vessel by coating it either with a molten titanium-silicon alloy, such as by flame spraying, or a slurry of titanium-silicon particles and then heating the so-coated body to a temperature sufficient to cause some of the alloy to diffuse into the boron nitride containing body and react with the contacted boron nitride while leaving at least a molecular layer of titanium-silicon alloy on the surface of the body. When the slurry technique is employed, the coating of titanium-silicon particles should not be heated above the melting point of the alloy, the preferred temperature range being from about 1,400° C. to about 1,500° C., depending on the exact alloy composition employed. Methods for forming a slurry of titanium-silicon particles are well known in the art and they will not be discussed in detail herein.

It should be noted here that the main advantage afforded by the beforementioned slurry technique is that it enables one to more easily coat irregularly shaped boron nitride containing bodies. In addition, it should also be noted that best results are obtained when the titanium-silicon alloy employed contains from about 40 to about 80 weight per cent silicon with the remainder being essentially titanium. This compositional range is preferred regardless of the method used to apply the alloy to the boron nitride containing vessel or crucible.

The following example illustrate in detail the practice of the instant invention.

EXAMPLE

A rectangular vessel of the type shown in the drawing 6½ inches long by 1½ inches in width by one-half inch in height having a cavity therein of approximately 3 cubic inches was fashioned from a composite refractory material comprising 50 weight per cent boron nitride with the remainder being essentially titanium diboride.

A slurry of titanium silicide particles having an average particle size of between 2 and 5 microns was prepared by suspending a powdered 44 weight per cent titanium, 56 weight per cent silicon alloy in a xylene slip which contained 20 volume per cent cyclopentadiene as a deflocculant.

The so produced titanium-silicon slurry was then applied to the floor of the cavity in the boron nitride base evaporation vessel (i.e., to its evaporation surface) and bonded thereto by heating the coated vessel in vacuum to a temperature of 1,450° C. in about 4 hours. A hold time of about 5 minutes was employed at this temperature. The boron nitride base vessel having its evaporation surface coated with a titanium-silicon alloy was then cooled to room temperature and removed from the furnace. A metallographic examination of the interface zone between the coating and the boron nitride base vessel showed that the floor of the vessel was coated with a thin layer of a titanium-silicon alloy which was metallurgically bonded thereto by a reaction product formed by reacting the contacted boron nitride with some of the titanium-silicon alloy.

The vessel of the preceding example was then used as an aluminum evaporation vessel in a conventional evaporation apparatus. The rate of evaporation of aluminum therefrom was double the rate of aluminum evaporation from a similar but uncoated vessel for the same power input to the system. This increase in evaporation rate was due to the fact that the aluminum readily and completely wetted the evaporation surface of the titanium-silicon coated boron nitride base vessel while such was not the case with the uncoated boron nitride base vessel.

The term evaporation as used herein and in the appended claim is meant to describe the surface of the evaporation vessel which is wetted by the metal to be evaporated. It is clear to those skilled in the art that this surface generally is the floor of the cavity provided in the evaporation vessel. However, it should be noted that this surface may also include the side walls of the evaporation vessel. In addition, it should be noted that it may not be necessary to coat the entire evaporation surface with a titanium-silicon alloy to realize the benefits of the instant invention. Accordingly, the instant invention is meant to include boron nitride base evaporation vessels wherein the whole as well as a portion of the evaporation surface thereof is coated with a titanium-silicon alloy.

From the foregoing, it will be readily appreciated by those skilled in the art that vessels produced according to the instant invention are not only ideally suited for use as evaporation vessels for aluminum in a conventional metallizing apparatus, but that they may also find utility as vessels for molten aluminum and other metals in other metal handling processes.

Accordingly, the example presented herein is for illustrative purposes only and is not intended to unduly limit the reasonable scope of the instant invention. The limitations of the invention are set forth in the following claims.

What is claimed is:

1. A vessel comprising from at least 20 to 80 weight per cent boron nitride with the remainder being a refractory material, and having at least a portion of its surface coated with a titanium-silicon alloy metallurgically bonded thereto.

2. The vessel of claim 1 wherein said refractory material is selected from the group consisting of titanium diboride, zirconium diboride, aluminum nitride, titanium nitride, calcium fluoride and mixtures thereof.

3. The vessel of claim 1 wherein said titanium-silicon alloy comprises from 40 to 80 weight per cent silicon with the remainder being essentially titanium.

4. The vessel of claim 2 wherein said titanium-silicon alloy comprises from 40 to 80 weight per cent silicon with the remainder being essentially titanium.

5. The vessel of claim 1 for use in the vacuum evaporation of aluminum base metals, said vessel having an evaporation surface of which at least a portion is coated with a titanium-silicon alloy metallurgically bonded thereto so as to provide a coated surface which is readily wetted by the aluminum base metals.

6. The vessel of claim 5 wherein said refractory material is selected from the group consisting of titanium diboride, zirconium diboride, aluminum nitride, titanium nitride, calcium fluoride and mixtures thereof.

7. The vessel of claim 5 wherein said titanium-silicon alloy comprises from 40 to 80 weight per cent silicon with the remainder being essentially titanium.

8. The vessel of claim 6 wherein said titanium-silicon alloy comprises from 40 to 80 weight per cent silicon with the remainder being essentially titanium.

9. The vessel of claim 5 wherein said vessel comprises 50 weight per cent boron nitride with the remainder being essentially titanium diboride; and wherein said evaporation surface is coated with a titanium-silicon alloy consisting of 44 weight per cent titanium and 56 weight per cent silicon.

10. The vessel of claim 5 wherein said vessel comprises a rectangular configuration having a cavity therein in which at least one surface defining said cavity is the evaporation surface and wherein at least a portion of said evaporation surface is coated with a titanium-silicon alloy metallurgically bonded thereto so as to provide a coated surface which is readily wetted by the aluminum base metals.

* * * * *